March 15, 1966  D. W. ROBINSON, JR  3,240,449
INFLATABLE SPONSONS FOR STABILIZING
AND SUPPORTING VEHICLES ON WATER
Filed March 23, 1964
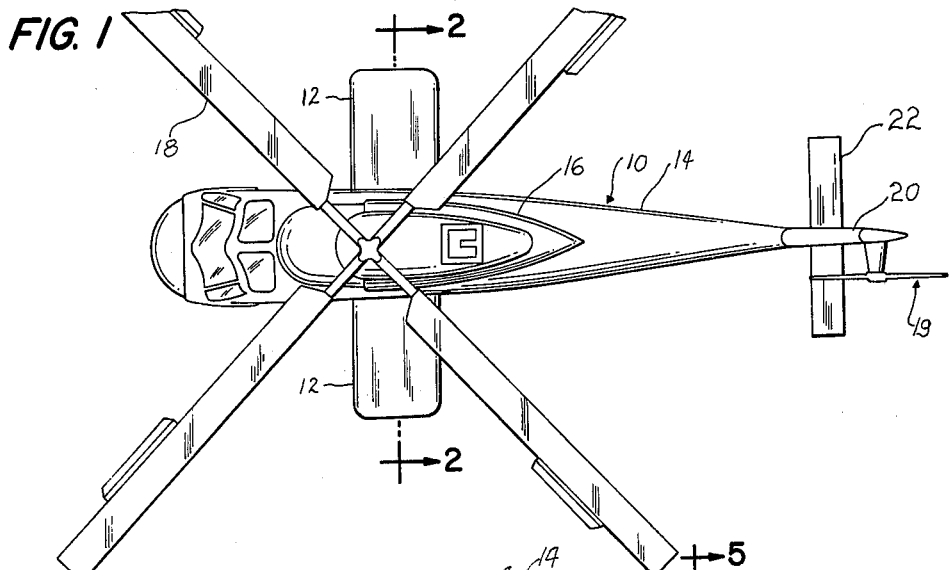
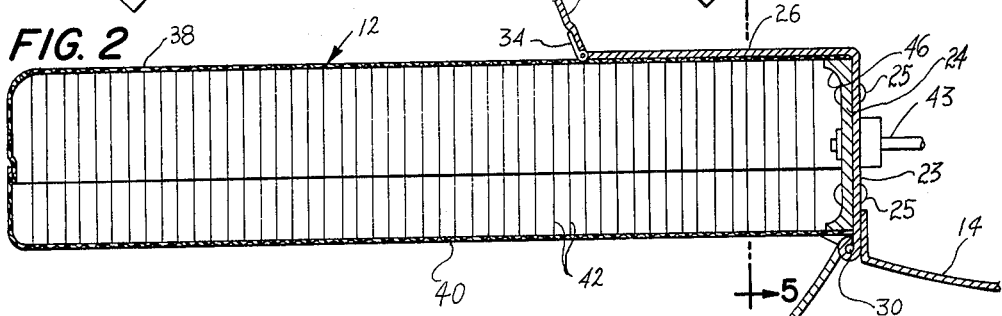
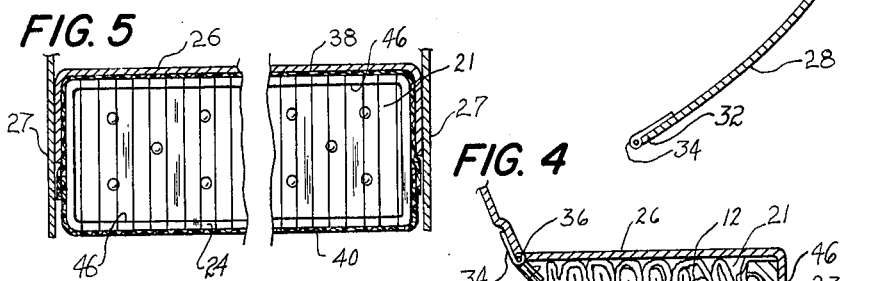
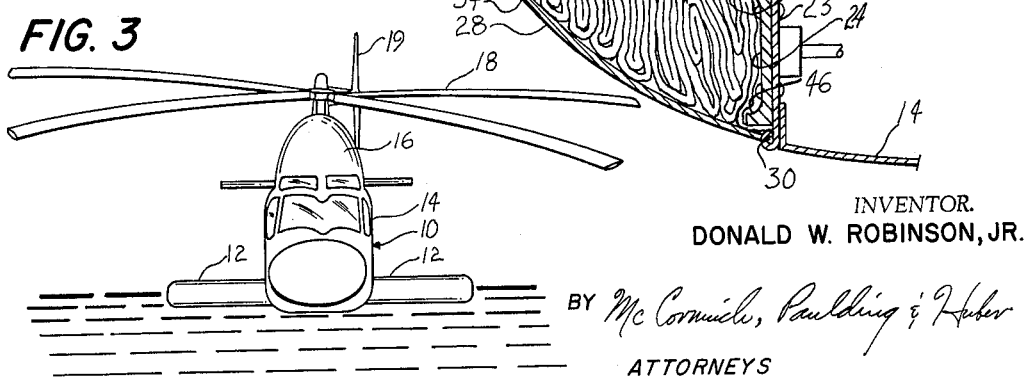
INVENTOR.
DONALD W. ROBINSON, JR.
ATTORNEYS //www.google.com/patents

United States Patent Office 3,240,449
Patented Mar. 15, 1966

3,240,449
INFLATABLE SPONSONS FOR STABILIZING AND SUPPORTING VEHICLES ON WATER
Donald W. Robinson, Jr., Hazardville, Conn., assignor to Kaman Aircraft Corporation, Bloomfield, Conn., a corporation of Connecticut
Filed Mar. 23, 1964, Ser. No. 353,796
7 Claims. (Cl. 244—105)

This invention relates generally to inflatable sponsons for vehicles which are to be supported on water, and more particularly to inflatable sponsons symmetrically arranged at either side of such a vehicle for hydrodynamically stabilizing the vehicle about its longitudinal or roll axis.

Although the invention has particular utility in connection with inflatable sponsons for a normally airborne vehicle, such as a helicopter, and is hereinafter shown and described as embodied in such a vehicle, it is to be understood that its utility is not so limited, many of the features herein described being susceptible of application to other vehicles adapted for flotation on water.

It is customary for aircraft, such as helicopters which fly over bodies of water, to be equipped with inflatable means capable of buoyantly supporting the aircraft in the event of a landing upon the water. The inflatable means usually comprise a plurality of floats which may be folded and stowed either before take-off or while the helicopter is in flight to reduce air resistance. Present-day helicopters, however, are quite top heavy as a result of the rotor and its associated power train so that the inflatable means often employed cannot provide adequate stability about the helicopter's longitudinal axis to compensate for the rolling tendency created by waves and ground swells or the like.

Accordingly, it is an object of the present invention to provide inflatable sponsons for a vehicle which is to be supported on water, which sponsons can be stored in a relatively small space when deflated and can stabilize the vehicle about its longitudinal axis when inflated.

A more specific object of the present invention is to provide inflatable sponsons for a vehicle adapted to be supported on water, which sponsons are relatively stiff when inflated so as to maintain their shape and relative position during roll of the vehicle about its longitudinal axis.

A further object of this invention is to provide inflatable sponsons for a helicopter or similar vehicle which sponsons are so connected to and arranged relative to other parts of the vehicle as to be incapable of slipping out of place when inflated and as to directly exert a righting moment on the vehicle when the vehicle tends to roll in one direction or the other from its desired upright position.

Other objects and advantages will be apparent from the following description and from the drawing forming a part hereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a plan view of a helicopter equipped with inflatable sponsons of the present invention.

FIG. 2 is an enlarged vertical sectional view of one of the sponsons shown in FIG. 1 and taken along the line 2—2 of that figure.

FIG. 3 is a front elevational view of the FIG. 1 helicopter.

FIG. 4 is a view similar to FIG. 2 but showing the sponson deflated and stowed in the receptable provided therefor in the hull of the helicopter.

FIG. 5 is a vertical sectional view taken on the line 5—5 of FIG. 2.

Turning now to the drawing in greater detail, FIGS. 1 and 3 show a conventional helicopter 10 which has been equipped with sponsons 12, 12 of the present invention. The helicopter comprises an elongated fuselage or hull 14 having a pylon 16 which houses the engine and the associated gearing required to drive a lifting rotor 18 which is rotatably supported relative to the hull. An anti-torque rotor 19 is also provided on a vertical tail structure 20, which tail structure also supports a horizontal tail surface 22.

In accordance with the present invention, two cavities or receptacles are provided respectively in the lower port and starboard sides of the helicopter hull 14. One such cavity is shown at 21 in FIG. 4 and it will be understood that a similar cavity is provided on the other side of the hull. Each cavity is defined by a longitudinally extending end wall 23, a generally horizontal upper wall 26, and two spaced side walls 27, 27. As best shown in FIGS. 2 and 4, each cavity 21 has associated with it both an inflatable sponson 12 and a contoured cover or door 28 hingedly connected to the hull by a hinge 30. The free end 32 of the cover 28 is normally releasably connected to the hull by a connecting means indicated generally at 34. This connecting means may take various different forms and as shown comprises a shear hinge including a length of safety wire 36 which, when the door 28 is closed, is passed through registering eyelets 34, 34 mounted on the hull and on the free end of the door 28. As so constructed the door can be readily opened by shearing the wire 36, and the wire is of such strength that it will shear under the load exerted upon it by the sponson 12 as the latter is inflated. It will of course be apparent that other "pop-open" or "pop-off" door constructions can be used with the sponsons of this invention, but within the speed range of present-day helicopters the simple hinge construction herein described is satisfactory.

Turning now to the construction of the sponsons 12, 12 and to their manner of connection with the hull 14, each sponson as shown in FIGS. 2, 4 and 5 is a structure which is flexible when uninflated and rigid when inflated to relatively low pressures in the order of 20 to 50 pounds per square inch. FIG. 4 shows one sponson uninflated and stowed in its hull cavity 21, and FIG. 2 shows the same sponson inflated for use. A suitable material for the sponsons is a material sold by the Goodyear Aerospace Corp. of Akron, Ohio, under the trademark "Airmat," the sponson in FIG. 2 being shown as made of such material. More particularly, FIG. 2 shows the illustrated sponson as comprising upper and lower skins 38 and 40, respectively, which are of woven sheet material impregnated with a rubberlike material to provide an airtight chamber therebetween. These woven sheets are overlapped and sealed at the side and outer end edges of the sponson as shown in FIGS. 2 and 5 and are interconnected by a plurality of tie threads 42, 42 of predetermined length which are pulled taut by internal air pressure when the sponson is inflated. As shown in FIG. 2, a stem 43 is provided for introducing gas under pressure to the sponson. The interconnecting tie threads 42, 42, or more particularly their continuations, comprise a part of the woven fabric of the upper and lower skins 38 and 40. In the simplest construction the tie threads 42, 42 are all of uniform length with the result that the upper and lower skins of each sponson are flat and parallel to one another. If desired, the lengths of the tie threads 42, 42 may be varied to vary the spacing between the skins at various points on the sponson, and accordingly the sponson may be shaped so as to curve in either or both of the chordwise and spanwise directions.

The inboard end of each sponson is firmly anchored to the hull 14, and for this purpose the cavity 21 in the illustrated case includes an anchor plate 24 which is secured in an airtight manner to the end wall 23 by a plurality of rivets 25, 25. The anchor plate includes a peripheral flange 46, and the inner end portions of the top and bottom skins 38 and 40 are secured and sealed to said flange as shown in FIGS. 4 and 5. The anchor plate is so located that when the associated sponson is inflated the sponson is engageable with the top wall 26 of its associated cavity. As so constructed, the anchor plate and the wall 26 react bending loads imposed on the sponson by rolling of the aircraft. The sponson 12 is also engageable with the side walls 27, 27 which react fore and aft bending loads imposed on the sponson by longitudinal movement of the aircraft. Thus, the buoyant force of the water on the sponsons is efficiently reacted and the sponsons will maintain their position relative to the hull as the helicopter rolls from side to side about its longitudinal axis.

The invention claimed is:

1. The combination with a vehicle having a hull of means defining two cavities located respectively on opposite sides of said hull with each cavity including a generally horizontal upper wall, and two sponsons each associated with a respective one of said cavities and each having an inboard end portion fixed relative to said hull adjacent the inboard end of the associated cavity, each of said sponsons comprising an inflatable structure of such a size and shape as to be stowable in its associated cavity when uninflated and each of said sponsons including means rendering the same very rigid in spanwise bending when inflated and being of such a size and shape when inflated as to extend laterally outwardly beyond said hull and to have an inboard portion along which its upper surface is engageable with the upper wall of the associated cavity, the upper surface of each inflatable structure when inflated being free of engagement with any other structure outboard of said inboard portion so that buoyant forces imposed on each sponson outboard of said hull are transferred to said hull as a result of the rigidity of said sponson.

2. The combination defined in claim 1 further characterized by each of said sponsons including two spaced skins joined by a plurality of tie threads integrally woven into the fabric of said skins which make the sponson rigid when inflated.

3. The combination defined in claim 1 further characterized by two covers each associated with a respective one of said cavities and each of which covers is movable between a normal position at which it closes the associated cavity and an open position at which the associated cavity is opened to permit the extension of the associated sponson therefrom, and means associated with each of said covers for normally holding the same in its closed position and for releasing the same for movement to its open position in response to inflation of the associated sponson.

4. The combination defined in claim 1 further characterized by two covers each associated with a respective one of said cavities, a hinge associated with each of said covers for pivotally connecting the same to said hull for movement between open and closed positions relative to the associated cavity, and means including a shear element for normally holding each cover in its closed position, said shear element being shearable by the force exerted on the associated cover by the associated sponson during the inflation of the latter to permit movement of the associated door to its open position.

5. The combination with a vehicle having a hull of means defining two cavities located respectively on opposite sides of said hull adjacent the water line thereof, each of said cavities including a horizontal upper wall having an outer edge, an inner vertical wall, and two longitudinally spaced vertical side walls, and two sponsons each associated with a respective one of said cavities, each of said sponsons comprising an inflatable structure having upper and lower skins joined by a plurality of tie threads of predetermined lengths in order to make said sponson rigid when inflated and having fore and aft side walls defined by said skins, each of said sponsons being stowable in its associated cavity when deflated and extending laterally outwardly from said hull and beyond the outer edge of said associated cavity when inflated, each of said sponsons further when inflated having an inboard portion of its upper skin engageable with the upper wall of the associated cavity to transfer a portion of the buoyant force to said hull, and means anchoring the inboard end of each sponson to the associated inner vertical wall of its cavity so that a substantial portion of said buoyant force is reacted at said outer edge of said cavity, the inboard portions of said fore and aft end walls of each sponson being engageable with the respective side walls of its cavity.

6. The combination defined in claim 5 further characterized by two covers each associated with a respective one of said cavities and each of which covers is movable between a normal position at which it closes the associated cavity and an open position at which the associated cavity is opened to permit the extension of the associated sponson therefrom, and means associated with each of said covers for normally holding the same in its closed position and for releasing the same for movement to its open position in response to inflation of the associated sponson.

7. The combination defined in claim 5 further characterized by two covers each associated with a respective one of said cavities, a hinge associated with each of said covers for pivotally connecting the same to said hull for movement between open and closed positions relative to the associated cavity, and means including a shear element for normally holding each cover in its closed position, said shear element being shearable by the force exerted on the associated cover by the associated sponson during the inflation of the latter to permit movement of the associated door to its open position.

References Cited by the Examiner

UNITED STATES PATENTS

| | | |
|---|---|---|
| 1,133,629 | 3/1915 | Foster. |
| 2,291,374 | 7/1942 | Canfield _____ 220—89 |
| 3,165,280 | 1/1965 | Lee _____ 244—12 |

FERGUS S. MIDDLETON, *Primary Examiner.*